United States Patent [19]
Mann

[11] Patent Number: 5,630,375
[45] Date of Patent: May 20, 1997

[54] LIVESTOCK FEEDER

[76] Inventor: Fred W. Mann, Box 444, Waterville, Kans. 66548

[21] Appl. No.: 414,223

[22] Filed: Mar. 31, 1995

[51] Int. Cl.⁶ ..................................................... A01K 5/00
[52] U.S. Cl. ....................................................... 119/51.03
[58] Field of Search ............................. 119/51.03, 51.01, 119/61, 62

[56] References Cited

U.S. PATENT DOCUMENTS 4,303,040  12/1981  Mann .

OTHER PUBLICATIONS

Mann Enterprises, Inc. "Bull Master" feeder product literature.

*Primary Examiner*—Gene Mancene
*Assistant Examiner*—Thomas Price
*Attorney, Agent, or Firm*—Litman, McMahon and Brown, L.L.C.

[57] ABSTRACT

A livestock feeder includes a frame assembly with multiple legs and a web subassembly including multiple web bars extending radially outwardly from a web center to the legs. An annular tub support ring is mounted on the insides of the legs slightly below the web bars. A tub includes a frusto-conical sidewall which converges downwardly to a tub bottom and a tub rim which is adapted for engagement with the tub supporting ring in a supporting relationship therewith. A circular, flexible cover is mounted on the web subassembly and has a covering position generally covering the tub rim and an open position deflected upwardly for accessing the tub contents.

11 Claims, 1 Drawing Sheet

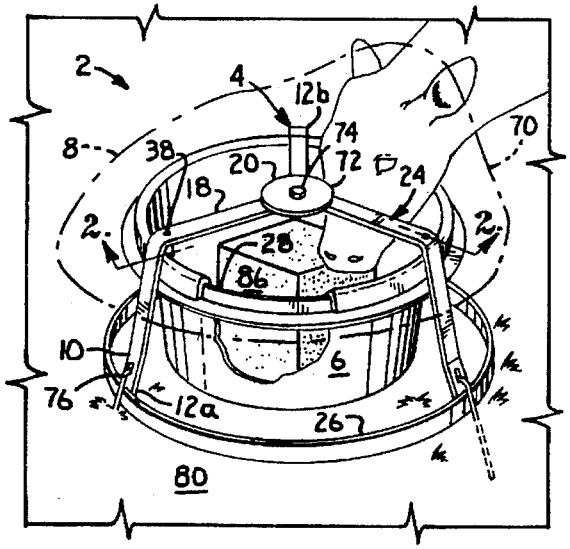
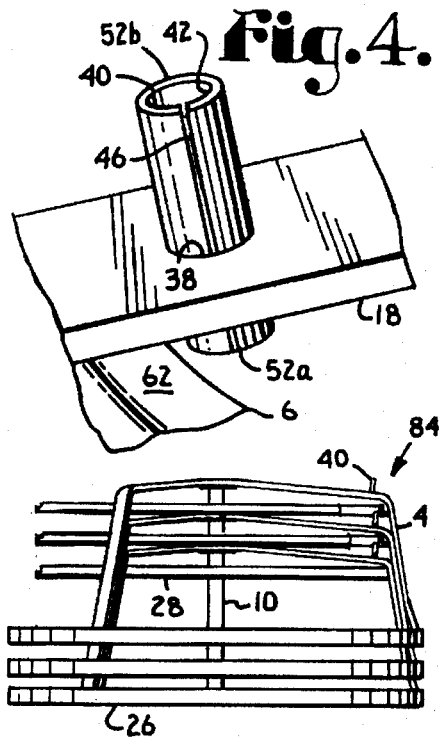
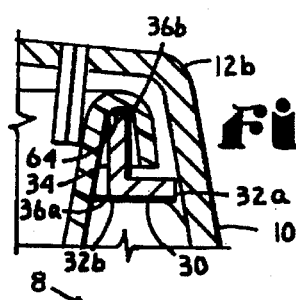
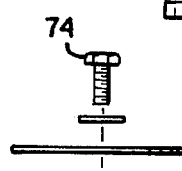
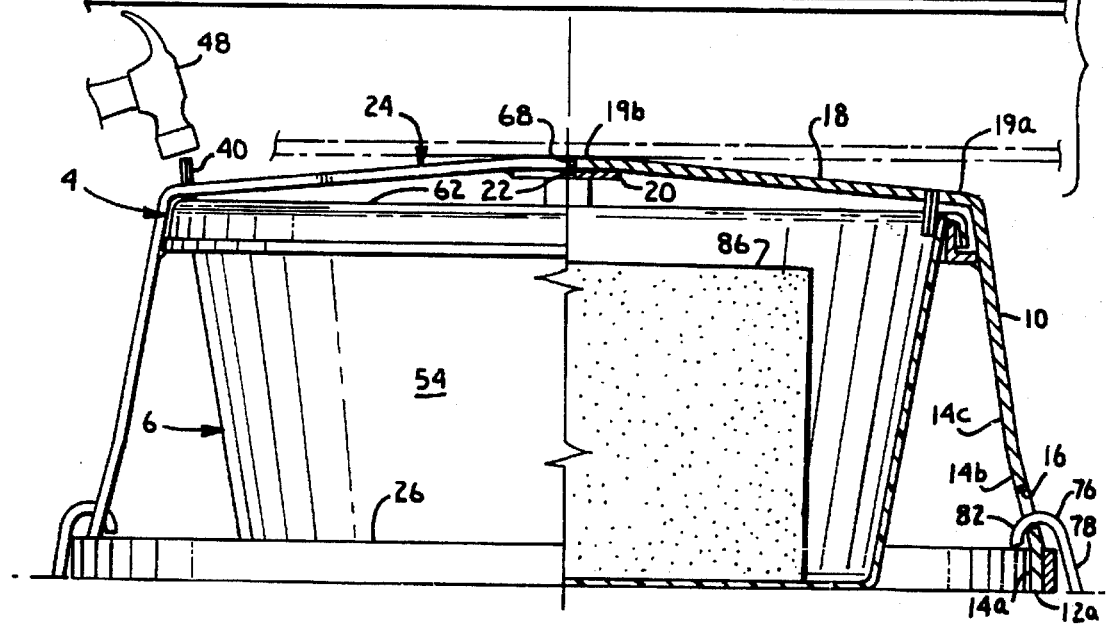

LIVESTOCK FEEDER

BACKGROUND OF THE INVENTION

1. Field of the Invention

The present invention relates generally to livestock feeders, and in particular to a portable livestock feeder with a flexible cover.

2. Description of the Related Art

Livestock feeders are commonly used in the field of animal husbandry and various designs have heretofore been proposed for meeting the requirements of particular applications. Such feeders can be employed with a wide variety of feed materials, including mineral supplements such as salt blocks, etc.

A common problem with feeding livestock relates to protecting and preserving the feed materials from the elements in the field. For example, dumping the feed materials on the ground is a common practice, but generally results in waste. Such waste of materials can create significant additional expense for the rancher or livestock operator. Feed material waste can also occur when materials are placed on the ground and trampled by the livestock.

Such waste and spoilage can be particularly expensive when it involves relatively expensive premium materials such as mineral feeds, feed supplements, etc.

Such feeders must satisfy the somewhat opposing criteria of providing the animals with access to the materials contained therein while providing effective weather protection therefor. An example of a solution to this problem is to provide a flexible cover which can be bent to an out-of-the-way configuration by livestock feeding thereat and a closed configuration when not being accessed by the livestock. For example, the Mann U.S. Pat. No. 4,303,040 discloses a livestock feeder which includes a flexible cover for manipulation by livestock which can "nose under" the cover edge for accessing feed materials contained therein.

In addition to the aforementioned objectives of livestock accessibility and protection from the elements, livestock safety is an important concern. In their attempts to gain access to the feed materials in a feeder, livestock can become entangled in its structure and thereby sustain injury or even death. Moreover, livestock feeders should preferably be relatively low in cost so as not to add significantly to the cost of a livestock feeding operation, and should be adaptable for use with various types of livestock.

Heretofore there has not been available a livestock feeder with advantages and features of the present invention. The livestock feeder of the present invention addresses the aforementioned objectives.

SUMMARY OF THE INVENTION

In the practice of the present invention, a livestock feeder is provided which includes a frame assembly having multiple legs, a web assembly with web bars extending inwardly from said legs to a web subassembly center, and a tub mounting ring mounted on the legs. A tub includes a rim for engaging the tub mounting ring. A cover is mounted on the web subassembly in covering relation over the tub. The frame assembly is adapted for nesting with another frame assembly and includes retainer pins for retaining the tub in position, which retainer pins in extended positions thereof align respective nested frame assemblies.

OBJECTS AND ADVANTAGES OF THE INVENTION

The principal objects and advantages of the present invention include providing a livestock feeder; providing such a feeder with a flexible cover; providing such a feeder which is readily accessible by livestock; providing such a feeder which is usable with cattle, horses, sheep, goats, etc.; providing such a feeder which is adaptable for loose or block feed materials; providing such a feeder which resists tipping by livestock; providing such a feeder which effectively shelters feed materials therein from the elements; providing such a feeder which is relatively safe to use by a variety of livestock; and providing such a feeder which is economical to manufacture, efficient in operation and particularly well-adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an upper, prospective view of a livestock feeder embodying the present invention.

FIG. 2 is a vertical cross-sectional view thereof taken generally along line 2—2 in FIG. 1.

FIG. 3 is a side elevational view of a plurality of frame assemblies thereof shown in a nested, stacked configuration.

FIG. 4 is an enlarged, fragmentary perspective view thereof, particularly showing a retainer pin thereof.

FIG. 5 is a greatly enlarged, fragmentary portion of the livestock feeder of FIG. 2, illustrating an annular tub support ring with a tub supported thereby.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a livestock feeder embodying the present invention. The livestock feeder 2 generally comprises a frame assembly 4, a tub 6 and a cover assembly 8.

II. Frame Assembly 4

The frame assembly 4 includes a plurality of legs 10 each having lower and upper ends 12a, 12b, a generally vertical lower section 14a, an intermediate section 14b which slopes inwardly from bottom-to-top and an upper section 14c. Each leg upper section 14c has an upwardly and inwardly sloping configuration with a slope angle which is slightly more vertical than that of the intermediate section 14b. Each leg intermediate section 14b includes a respective stake receiver 16.

A plurality of web bars 18 with outer and inner ends 19a, 19b converge inwardly to a web center plate 20 mounted on the inner ends 19b and having a threaded receiver 22. The web bars 18, together with the web center plate 20, form a web subassembly 24.

An annular base band 26 is mounted on the leg lower sections 14a in proximity to the leg lower ends 12a.

An annular tub support ring 28 comprises an angle-section member with a lower flange 30 having a generally horizontal orientation and outer and inner edges 32a, 32b. Tub capture means comprising an inner, generally vertical flange 34 includes a lower edge 36a and an upper, free edge 36b. The lower flange inner edge 32b is connected (e.g., welded) to the inner flange lower edge 36a. The inner flange upper edge 36b is positioned in spaced relation inwardly from the frame assembly legs 10.

Each web bar 18 includes a respective retainer pin receiver 38. A plurality of retainer pins 40 (e.g., three are shown corresponding to the number of web bars 18) are provided in the web bars 18 in proximity to respective outer ends 19a thereof. Each retainer pin 40 has a generally tubular configuration with a hollow bore 42 and a sidewall 44 with a longitudinal slit 46 therein.

The retainer pin is compressible slightly by closing the sidewall 44 on the longitudinal slit 46, and has an extended position as shown on the left side of FIG. 2 and an inserted position as shown on the right side of FIG. 2. Since the frame assembly 4 is adapted to nest with another similar frame assembly, the retainer pin 40 can be retained in position by driving it into the retainer pin receiver 38, e.g., with a hammer 48. The retainer pin 40 includes an inner end 52a and an outer end 52b. The retainer pin 40 can have an extended position as shown on the left side of FIG. 2 when initially installed and during shipment, and can be driven through the retaining pin receiver 38 to a fully-inserted position (right side of FIG. 2) to a position whereat the retaining pin outer end 52b is substantially flush with the web bar 18.

A plurality of stakes 76 are provided which include shanks 78 for driving into the ground 80 and hooks 82 which are received in the stake receivers 16. Three stakes 76 can be provided which correspond in number to the legs 10.

III. Tub 6

The tub 6 includes a frusto-conical sidewall 54 with lower and upper edges 56a, 56b. The tub lower edge 56a is connected to a tub bottom 58 which, together with the sidewall 54, forms a receptacle 60 which is upwardly open. A rim 62 extends outwardly from the sidewall upper edge 56b and forms a downwardly-open tub rim channel 64 which receives the angle section upper edge 36b with the tub 6 mounted on the frame assembly 4. The tub 6 converges downwardly and is likewise adapted to nest with other tubs having similar configurations.

IV. Cover Assembly 8

The cover assembly 8 includes a circular cover 66 with a concentric opening 68, a concentric mounting bolt receiver 68 and a circular cover margin 70. A washer 72 is placed on top of the cover 66 concentrically therewith and is retained in place by a cover mounting bolt 74 extending through the washer 72, the cover mounting bolt receiver 68 and is threadably received in the web center plate receiver 22.

V. Manufacture and Operation

The livestock feeder 2 can be fabricated from any material suitable for meeting the requirements of particular applications and environments in which the livestock feeder 2 is placed. Such materials are preferably selected to withstand exposure to the elements and abusive handling by livestock.

The frame assembly 4 can comprises, for example, steel which can be painted or otherwise suitably treated (e.g., stainless steel) to withstand exposure to the elements. The tub 6 can comprise a suitable plastic and the cover 66 can comprise a suitable elastomeric material providing both resiliency and weather protection.

The shipping configuration of multiple frame assemblies 4 is shown in FIG. 3 wherein the frame assemblies are nested with the retainer pins 40 in their extended positions. In this position, the retainer pins are adapted for engagement with the tub support ring inner flange 34 of the frame assembly 4 located immediately above. The retaining pins 40 of the frame assemblies 4 function to maintain the vertical alignment of stack 84 of the frame assemblies 4 in a shipping configuration thereof as shown in FIG. 3.

The livestock feeder 2 can be assembled by placing the rim 62 of the tub 6 over the tub support member inner flange 34 with the upper edge 36b thereof received in the tub rim channel 64. The tub support ring 28 is preferably positioned relatively close to the web bars 18 whereby relatively little clearance is provided between the tub rim 62 and the web bars 18. Moreover, the web bars 18 are positioned in a nearly horizontal orientation (i.e., approximately 5° from horizontal) to minimize the clearance between the rim 62 and the web bars 18 whereby livestock are less likely to insert their heads under the web bars 18 and thereby become entangled in the livestock feeder 2. The web bars 18 thus extend outwardly from the web center plate 20 mounted on their inner ends 19b to outer ends 19a and are deflected approximately 5° downwardly each from a horizontal plane as shown in FIG. 2.

Moreover, relatively low clearance is provided between the rim 62 and the cover 66. Even though relatively little clearance is provided in this area, livestock will generally raise the cover 66 sufficiently to access feed materials, such as a salt block 86, or other feed supplements and the like which may be placed in the tub receptacle 60. The cover 66 can be folded back relatively easily for purposes of replenishing a material in the tub receptacle 60.

The stakes 76 are adapted for securing the livestock feeder 2 in place on a ground surface 80. Alternatively, the base ring 26 could be provided with weights or some other means could be provided for anchoring the livestock feeder 2.

Although the frame assembly 4 is shown with three web bars 18, other numbers of web bars in different configurations could be employed. Moreover, the livestock feeder 2 could assume a different configuration, such as a rectangle or other polygon.

It is to be understood that while certain forms of the present invention have been illustrated and described herein, it is not to be limited to the specific forms or arrangement of parts described and shown.

What is claimed and desired to be secured by Letters Patent is as follows:

1. A livestock feeder, which comprises:
   (a) a frame including a plurality of legs each having upper and lower ends, said frame further including web means connected to said leg upper ends and converging at a center of said frame;
   (b) tub means for holding feed having an upwardly-open receptacle and a rim;
   (c) tub capture means connected to each of said legs in proximity to their upper ends for capturing said tub rim whereby said tub means is mounted on the frame; and
   (d) tub retainer means for retaining said tub means in a locked position on said frame;
   (e) a flexible cover mounted on said web means and flexibly bendable between a first position in close proximity to said tub rim in covering relation over said tub and a second position bent upwardly therefrom for providing livestock access to said tub receptacle; and
   (f) said web means comprising a plurality of support bars each extending from a respective leg upper end to a web center, each web bar having an outer end connected to a respective leg upper end and an inner end, said web bar inner ends converging and being interconnected at a center of said web means.

2. The invention of claim 1 wherein:
   (a) said tub retainer means comprises a retainer pin receiver in said web means and a retainer pin selectively receivable in said receiver.

3. The invention of claim 2 wherein:
   (a) said retainer pin is a split tubular pin with inner and outer ends, said pin being adapted for axial insertion and removal in and from said receiver.

4. The livestock feeder of claim 3 wherein:
   (a) said frame is configured for nesting with another frame of similar configuration; and
   (b) said retainer pin in an inserted position thereof engages the tub capture means of the other frame with said frames in their nested configurations.

5. The livestock feeder of claim 1, wherein:
   (a) said tub capture means comprises an angle section ring with a bottom flange having an outer edge attached to said legs and an inner, generally vertical flange engaging tub rim with said tub mounted on said frame.

6. The livestock feeder according to claim 5, wherein:
   (a) said tub rim includes a downwardly-open rim channel receiving said angle section ring inner flange.

7. The livestock feeder according to claim 1, which includes:
   (a) a threaded receiver formed at a convergence of said web support bars; and
   (b) a mounting bolt extending through said cover and into said web receiver retaining said cover on said frame.

8. The livestock feeder according to claim 1 wherein:
   (a) each said web support bar slopes inwardly and upwardly from a respective leg upper end to said center at an angle of approximately 5° from horizontal.

9. The invention of claim 8, which includes:
   (a) an annular base band connected to said leg lower ends.

10. The livestock feeder according to claim 9, which includes:
    (a) a plurality of stakes adapted for insertion in the ground for anchoring said livestock feeder each said stake being selectively connectible to a respective leg and;
    (b) each said leg including a stake receiver in proximity to its lower end for receiving a respective stake.

11. A livestock feeder, which comprises:
    (a) a frame assembly including:
       (1) a plurality of legs each having upper and lower ends and an orientation sloping inwardly from bottom-to-top;
       (2) each leg including a generally vertical section adjacent to its lower end;
       (3) a plurality of web bars each having an outer end connected to a respective leg upper end and an inner end;
       (4) a web center plate mounted on said web bar inner ends and interconnecting same;
       (5) each said web bar sloping upwardly in an inward direction at an angle of approximately 5° from horizontal;
       (6) a threaded cover bolt receiver in said web center plate centered with respect to said web web center plate;
       (7) an annular base ring fixedly connected to said leg lower end vertical sections;
       (8) an annular tub support ring having the cross-sectional configuration of an angle-section member with a generally horizontal base flange with an outer edge fixedly connected to said legs in spaced relation below their upper ends and an inner edge, said support ring further including a generally vertical, inner flange with a lower edge connected to said base flange inner edge and an upper, free edge;
       (9) each said web bar having a retaining pin receiver located in proximity to its outer end;
       (10) each said leg including a stake receiver in proximity to its lower end; and
       (11) each said leg having a lowermost section with a generally vertical orientation, an intermediate section with an orientation sloping inwardly from bottom-to-top; and an upper section with an orientation sloping inwardly from bottom-to-top at a steeper, more vertical angle than the angle of said intermediate section;
    (b) a tub including:
       (1) a frusto-conical sidewall having a downwardly-tapered configuration;
       (2) upper and lower edges;
       (3) a bottom located at said lower edge;
       (4) a rim located at said sidewall upper edge and forming a downwardly-open, annular channel, said rim protruding radially outwardly;
       (5) a bottom located at said sidewall lower edge and forming with said sidewall a receptacle;
       (6) said tub being adapted for nesting with other, similar tubs; and
       (7) said tub having a mounted position with said angle section upper edge received in said rim channel;;
    (c) said tub sidewall and bottom forming an upwardly-open receptacle and said sidewall having a downwardly-converging configuration;
    (d) a plurality of tub retainer pins each comprising a hollow tubular pin with inner and outer ends and a sidewall forming a longitudinal slot;

(e) flexible, circular cover means having a center with a retainer bolt receiver;

(f) said cover subassembly including:

(1) a circular, flexible cover having a first position generally covering said receptacle and engaging said web bars and a second, open position bent upwardly and permitting access by livestock to said tub receptacle, said cover including a centered receiver;

(2) a cover mounting washer including a receiver and positioned on top of said cover concentrically therewith; and (3) a cover mounting bolt threadably received in said hub receiver and extending through said washer receiver and said cover receiver;

(g) a plurality of stakes each including a hook end and a shank, said shank being adapted for embedding in the ground and said hook end being selectively received in a respective stake receiver; and (h) said frame being nestable with a frame of similar configuration, said retainer pins in their extended positions engaging the support ring inner flange for aligning said frames with respect to each other in their nested configurations.

* * * * *